(12) United States Patent
Seong et al.

(10) Patent No.: US 10,904,633 B2
(45) Date of Patent: Jan. 26, 2021

(54) DISPLAY DEVICE FOR DISPLAYING USER INTERFACE CONTROLLING CHANNEL BASED ON USER INPUT AND CONTROLLING METHOD THEREOF

(71) Applicant: SAMSUNG ELECTRONICS CO., LTD., Suwon-si (KR)

(72) Inventors: Ju Hyun Seong, Seoul (KR); Myung Kwan Choi, Suwon-si (KR); Jang Won Seo, Seoul (KR); Jae Gu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/846,867

(22) Filed: Dec. 19, 2017

(65) Prior Publication Data
US 2018/0176653 A1    Jun. 21, 2018

(30) Foreign Application Priority Data
Dec. 19, 2016    (KR) .......................... 10-2016-0173787

(51) Int. Cl.
*H04N 5/445*    (2011.01)
*H04N 21/482*    (2011.01)
(Continued)

(52) U.S. Cl.
CPC ............. *H04N 21/482* (2013.01); *G06F 3/02* (2013.01); *G06F 3/04855* (2013.01);
(Continued)

(58) Field of Classification Search
CPC ............. H04N 21/4622; H04N 21/482; H04N 21/478; H04N 21/84; H04N 21/4821;
(Continued)

(56) References Cited

U.S. PATENT DOCUMENTS 5,141,003 A * 8/1992 Dawson ............... A24C 5/1814
131/108
6,057,831 A    5/2000 Harms
(Continued)

FOREIGN PATENT DOCUMENTS

EP    0992157 A1    4/2000
EP    2429184 A1    3/2012
(Continued)

OTHER PUBLICATIONS

International Search Report and Written Opinion (PCT/ISA/210 and PCT/ISA/237), dated Apr. 6, 2018 by International Searching Authority in International Application No. PCT/KR2017/014969.
(Continued)

*Primary Examiner* — Annan Q Shang
(74) *Attorney, Agent, or Firm* — Sughrue Mion, PLLC

(57)    ABSTRACT

A display device is provided. The display device includes a first communication interface receiving broadcast content, a second communication interface which receives a user input, a display, and a processor electrically connected with the display, the first communication interface, and the second communication. The processor controls the display to display a first user interface (UI) including a scroll bar including a plurality of points corresponding to a plurality of channels, a cursor moving on the scroll bar depending on the user input, and information on a channel corresponding to a point at which the cursor is displayed, if the second communication interface receives a preset user input. The processor is controls the display to additionally display a second UI including information on one or more channels adjacent to the channel corresponding to the point at which the cursor is displayed, if the preset user input is stopped.

19 Claims, 14 Drawing Sheets

(51) Int. Cl.
*H04N 21/422* (2011.01)
*H04N 21/431* (2011.01)
*G06F 3/0485* (2013.01)
*H04N 21/438* (2011.01)
*G06F 3/02* (2006.01)

(52) U.S. Cl.
CPC ... *H04N 21/42204* (2013.01); *H04N 21/4316* (2013.01); *H04N 21/4383* (2013.01); *G06F 2203/0384* (2013.01)

(58) Field of Classification Search
CPC .. H04N 21/4345; H04N 21/4316; H04N 5/45; H04N 5/50; H04N 5/44543; H04N 5/44513
See application file for complete search history.

(56) References Cited

U.S. PATENT DOCUMENTS

| | | | | |
|---|---|---|---|---|
| 6,181,333 | B1 * | 1/2001 | Chaney | H04N 21/4314 345/158 |
| 6,411,308 | B1 | 6/2002 | Blonstein et al. | |
| 6,721,953 | B1 * | 4/2004 | Bates | H04N 21/47 725/39 |
| 8,073,955 | B1 * | 12/2011 | Gagnon | H04N 21/84 709/203 |
| 8,589,977 | B1 * | 11/2013 | Frusciano | H04N 5/44543 715/785 |
| 8,949,902 | B1 * | 2/2015 | Fabian-Isaacs | H04N 21/4821 725/52 |
| 2004/0049784 | A1 * | 3/2004 | Grzeczkowski | H04N 5/44543 725/46 |
| 2005/0177847 | A1 | 8/2005 | Konig et al. | |
| 2006/0020970 | A1 * | 1/2006 | Utsuki | H04N 21/4312 725/39 |
| 2006/0024021 | A1 * | 2/2006 | Utsuki | H04N 5/44543 386/230 |
| 2007/0209018 | A1 * | 9/2007 | Lindemann | G06F 3/04855 715/784 |
| 2009/0007007 | A1 * | 1/2009 | Voros | G06F 3/0485 715/786 |
| 2009/0138821 | A1 * | 5/2009 | Shinokura | G06F 3/0482 715/810 |
| 2009/0249399 | A1 * | 10/2009 | Schlarb | H04N 21/47 725/43 |
| 2010/0269038 | A1 | 10/2010 | Tsuda | |
| 2011/0078738 | A1 * | 3/2011 | Papaspyropoulos | H04N 21/4312 725/40 |
| 2011/0271302 | A1 * | 11/2011 | Carlsgaard | H04N 5/4403 725/39 |
| 2012/0096878 | A1 | 4/2012 | Kamishima et al. | |
| 2014/0150026 | A1 * | 5/2014 | Mountain | H04N 21/4821 725/52 |
| 2015/0150053 | A1 * | 5/2015 | Hardin | H04N 5/44543 725/52 |
| 2015/0326909 | A1 * | 11/2015 | Eun | H04N 21/4126 725/38 |
| 2015/0373392 | A1 * | 12/2015 | Sriraman | H04N 21/4221 725/52 |
| 2016/0299502 | A1 * | 10/2016 | Chamberlain | G05D 1/0255 |

FOREIGN PATENT DOCUMENTS

| | | |
|---|---|---|
| KR | 1020060009212 A | 1/2006 |
| KR | 1020130121293 A | 11/2013 |
| WO | 9904559 A1 | 1/1999 |

OTHER PUBLICATIONS

Communication dated Jun. 24, 2019, from the European Patent Office in counterpart European Application No. 17883672.2.
Communication dated Nov. 7, 2019 by the European Patent Office in counterpart European patent Application No. 17883672.2.

* cited by examiner

DISPLAY DEVICE FOR DISPLAYING USER INTERFACE CONTROLLING CHANNEL BASED ON USER INPUT AND CONTROLLING METHOD THEREOF

CROSS-REFERENCE TO RELATED APPLICATION(S)

This application claims priority from Korean patent application 10-2016-0173787, filed on Dec. 19, 2016 in the Korean Intellectual Property Office, the entire disclosure of which is incorporated herein by reference.

BACKGROUND

1. Field

Apparatuses and methods consistent with example embodiments relate to a display device for displaying a user interface controlling a channel based on a user input and a controlling method thereof.

2. Description of Related Art

In related art, to change a channel of content output to a display device, a channel-up key or the channel-down key of a remote controller has been used. If the channel-up key or the channel-down key is input once, a channel is changed to a previous or next channel stored in a current channel map.

In addition, another manner for changing the channel is to directly input a channel number or to display a channel list such that a channel from the channel list is selected.

Further, when a content signal is received from an external device such as a set-top box, the above channel changing manner is used.

SUMMARY

Aspects of example embodiments address at least the above-mentioned problems and/or disadvantages and provide at least the advantages described below.

According to an aspect of an example embodiment, there is provided display device including: a first communication interface configured to receive broadcast content; a second communication interface configured to receive a user input; a display; and a processor that is electrically connected to the display, the first communication interface, and the second communication interface, wherein the processor is configured to: while receiving a preset user input through the second communication interface, control the display to display a first user interface (UI) including a scroll bar including a plurality of points corresponding to a plurality of channels, a cursor moving on the scroll bar depending on the user input, and information about a channel corresponding to a point at which the cursor is displayed; and in response to the preset user input being stopped, control the display to additionally display a second UI including information about one or more channels adjacent to the channel corresponding to the point at which the cursor is displayed.

The preset user input may be a channel movement input occurring a predetermined number of times within a predetermined time.

The second UI may include: at least one from among a number of the channel corresponding to the point at which the cursor is displayed, a name of a program broadcast through the channel corresponding to the point at which the cursor is displayed, and a name of the channel corresponding to the point at which the cursor is displayed.

The first UI may include an indicator displayed at a portion of the plurality of points of the scroll bar.

The first UI may include a number of the channel corresponding to the indicator.

The scroll bar may include a first area including the indicator and a second area other than the first area, and wherein the cursor moves at a first speed on the first area and moves at a second speed on the second area, the second speed being faster than the first speed.

The scroll bar may include a first area including the indicator, and wherein the cursor moves to a point corresponding to the indicator in response to reception of the preset user input being stopped in a state in which the cursor is displayed in the first area.

The scroll bar may include a first area corresponding to a portion of the plurality of channels, the portion of the plurality of channels corresponding to a first category, and a second area corresponding to another portion of the plurality of channels, in the another portion of the plurality of channels corresponding to a second category, and wherein the first area is visually distinguished from the second area.

The display device may include a memory, wherein the first communication interface is further configured to receive broadcast content from an external electronic device, wherein the memory is configured to store information about a channel of the broadcast content received from the external electronic device, and wherein the processor is further configured to: select a channel among the plurality of channels based on the user input; and transmit a signal based on the selected channel through the second communication interface such that an input for the selected channel is transmitted to the external electronic device.

The processor may be further configured to: recognize a text displayed on the display to detect a channel of broadcast content output on the display, wherein an initial position of the cursor on the scroll bar is a point corresponding to the detected channel.

The processor may be further configured to: transmit a channel number input, which corresponds to the selected channel, to the external electronic device through the second communication interface.

The second communication interface may be further configured to receive the user input from a remote control device, and wherein the processor is further configured to: transmit a control signal to the remote control device through the second communication interface such that the remote control device transmits a signal for inputting a number of the selected channel to the external electronic device.

The processor may be further configured to: select a channel corresponding to a point at which the cursor is displayed for a preset time.

According to an aspect of another example embodiment, there is provided a controlling method of a display device, the controlling method including: receiving a preset user input; displaying, while receiving the preset user input, a first user interface (UI) including a scroll bar including a plurality of points corresponding to a plurality of channels, a cursor moving on the scroll bar depending on the user input, and information about a channel corresponding to a point at which the cursor is displayed; and moving the cursor on the scroll bar based on the user input; displaying, in response to the preset user input being stopped, a second UI including information about one or more channels adjacent to the channel corresponding to the point at which the cursor is displayed; and selecting the channel corresponding to the point at which the cursor is displayed, depending on the user input.

The preset user input may be a channel movement input occurring a predetermined number of times within a predetermined time.

The second UI may include at least one from among a number of the channel corresponding to the point at which the cursor is displayed, a name of a program broadcast through the channel corresponding to the point at which the cursor is displayed, and a name of the channel corresponding to the point at which the cursor is displayed.

The first UI may include an indicator displayed on a portion of the plurality of points of the scroll bar, wherein the scroll bar comprises a first area including the indicator and a second area other than the first area, and wherein the moving of the cursor on the scroll bar based on the user input comprises moving the cursor on the first area at a first speed and moving the cursor on the second area at a second speed, the second speed being faster than the first speed.

The controlling method may include moving the cursor to a point corresponding to the indicator in response to reception of the preset user input being stopped in a state in which the cursor is displayed in the first area.

The controlling method may include transmitting, to a remote control device, a control signal for transmitting an input signal based on the selected channel to an external electronic device.

The selecting of the channel may include selecting a channel corresponding to a point at which the cursor is displayed for a preset time.

According to example embodiments, the change to the channel desired by the user may be rapidly made only by using the channel up or down inputs The information is provided in various forms. Accordingly, the user may intuitively recognize the position of the desired channel by the user.

In addition, various effects provided directly or indirectly will be understood through the example embodiments.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of example embodiments will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
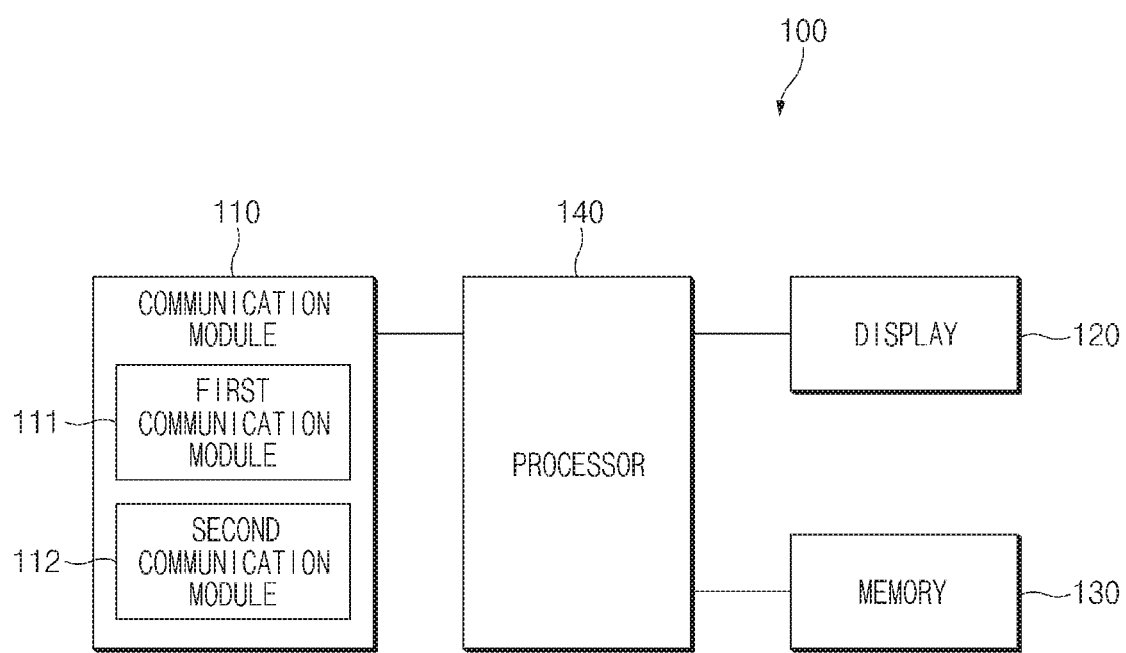
FIG. 1 is a block diagram illustrating a display device, according to an example embodiment.

Hereinafter, various example embodiments may be described with reference to accompanying drawings. Accordingly, those of ordinary skill in the art should understand that the present disclosure is not limited to a specific embodiment, but various modifications, equivalents, and/or alternatives of the example embodiments are included in the present disclosure. In the following description made with respect to the accompanying drawings, similar elements will be assigned with similar reference numerals.

Aspects of example embodiments provide a device capable of rapidly and easily manipulating a channel with a channel-up input or a channel-down input.

The manner to change the channel by using the channel-up key or the channel-down key has a problem in that the channel-up key or the channel-down key has to be repeatedly pressed to change many channels.

The manner to directly input the channel number or use the channel list has a problem in that a user has to memorize a channel number.

Aspects of example embodiments address at least the above-mentioned problems and/or disadvantages and to provide at least the advantages described below. Accordingly, aspects of example embodiments provide a device capable of rapidly and easily manipulating a channel with a channel-up input or a channel-down input.

FIG. 1 is a block diagram illustrating a display device, according to an example embodiment.

Referring to FIG. 1, according to an example embodiment, a display device 100 may include a communication module 110 (e.g., communication interface), a display 120, a memory 130, and a processor 140.

The communication module 110 may include a first communication module 111 and a second communication module 112.

The first communication module 111 may receive broadcast content including at least one channel. The first communication module 111 may make wired and wireless communication. In addition, the first communication module 111 may receive the broadcast content from a broadcast signal provider or may receive the broadcast content an external electronic device such as a set-top box, or a game console (e.g., Xbox™, PlayStation™, or the like).

The second communication module 112 may receive a user input (e.g., channel movement input) and may transmit a control signal based on the user input. The second communication module 112 may make wired and wireless communication. For example, the second communication module 112 may include wireless communication based on technologies such as infrared (IR), Bluetooth, near field communication (NFC), and a wireless-fidelity (Wi-Fi).

The second communication module 112 may receive the user input from a remote control device such as a remote controller, a keyboard, or the like.

According to an example embodiment, the second communication module 112 may transmit the control signal to the remote control device. For example, if the second communication module 112 receives the user input from the remote control device such as a multi-band (MBR) remote controller, the second communication module 112 may transmit the control signal to the remote control device such that the remote control device transmits a signal corresponding to the user input to the external electronic device.

According to an example embodiment, the second communication module 112 may transmit an input signal based on a user input to the external electronic device. For example, if the second communication module 112 receives the user input, the second communication module 112 may directly transmit the input signal based on the user input to the external electronic device.

According to an example embodiment, the display device 100 may include a user input unit to acquire the user input through the user input unit instead of the second communication module 112. For example, the user input unit may include a channel movement button provided in the display device.

The display 120 may display an image of the broadcast content. For example, the display 120 may display an image, which is included in the broadcast content, depending on the broadcast content received through the first communication module 111. According to an example embodiment, the display 120 may display a user interface (UI) or may simultaneously display the image included in the broadcast content and the UI.

The memory 130 may store information on the channel of the broadcast content. The information on the channel may include a channel number, the name of a program broadcasted through the channel, and a channel name.

For example, in the case that the first communication module 111 directly receives broadcast content from the broadcast signal provider, the memory 130 may store the information on a channel included in the broadcast content. According to an example embodiment, in the case that the first communication module 111 receives the broadcast content from an external electronic device, the external electronic device may store the information on the channel in the broadcast content, which is received from an external server.

The processor 140 may be electrically connected with the display 120, the first communication module 111, and the second communication module 112 to control the overall operations of the display device 100. For example, the processor 140 may display the image included in the broadcast content, which is received through the first communication module 111, on the display 120. The processor 140 may display a first UI and a second UI, which are to be described below, based on the user input received by the second communication module 112 and may receive the selection for a channel.

In the case that the first communication module 111 directly receives the broadcast content from the broadcast signal provider, the processor 140 may tune a channel of broadcast content, which is displayed on the display 120, to the selected channel. In the case that the first communication module 111 receives the broadcast content from the external electronic device, the processor 140 may transmit a signal based on the selected channel to the external electronic device to transmit the input for the selected channel to the external electronic device through the second communication module 112.

Figure 2:
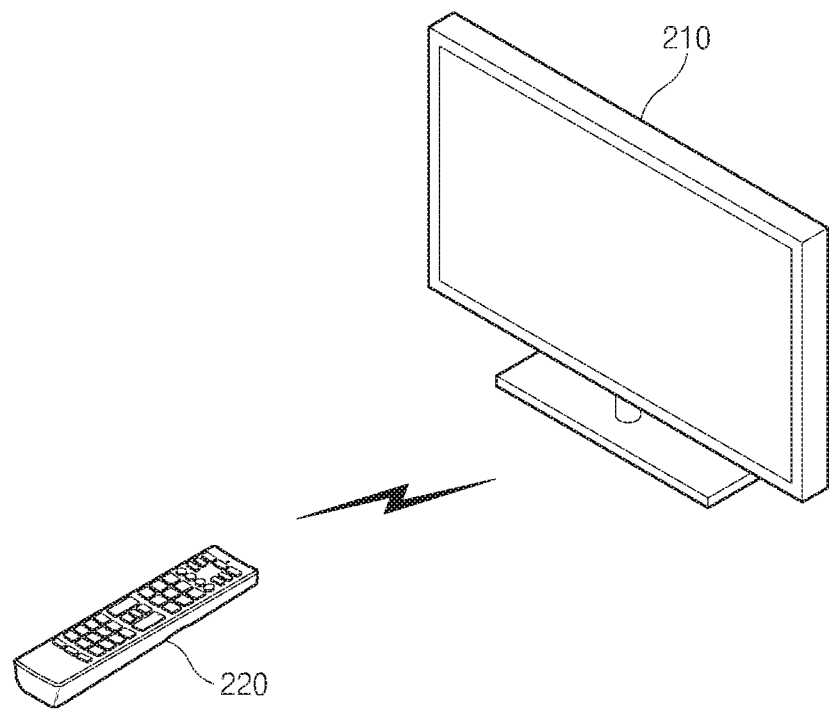
FIG. 2 is a view illustrating a display device and a remote controller, according to an example embodiment.

FIG. 2 is a view illustrating a display device and a remote controller, according to an example embodiment.

According to an example embodiment, a display device 210 may directly receive broadcast content from a broadcast signal provider. For example, the display device 210 may be connected with an antenna to receive the broadcast content.

A remote control device 220 may transmit a user input to the display device 210. For example, the remote control device 220 may be a remote controller, a mouse, a keyboard, or the like. The remote control device 220 may transmit a user input through Bluetooth, IR communication, or Wi-Fi.

Hereinafter, description will be made with respect to FIGS. 3 to 8, regarding a method that a display device, which directly receives broadcast content from the broadcast signal provider, displays a UI and performs tuning to a selected channel through the UI.

Figure 3:
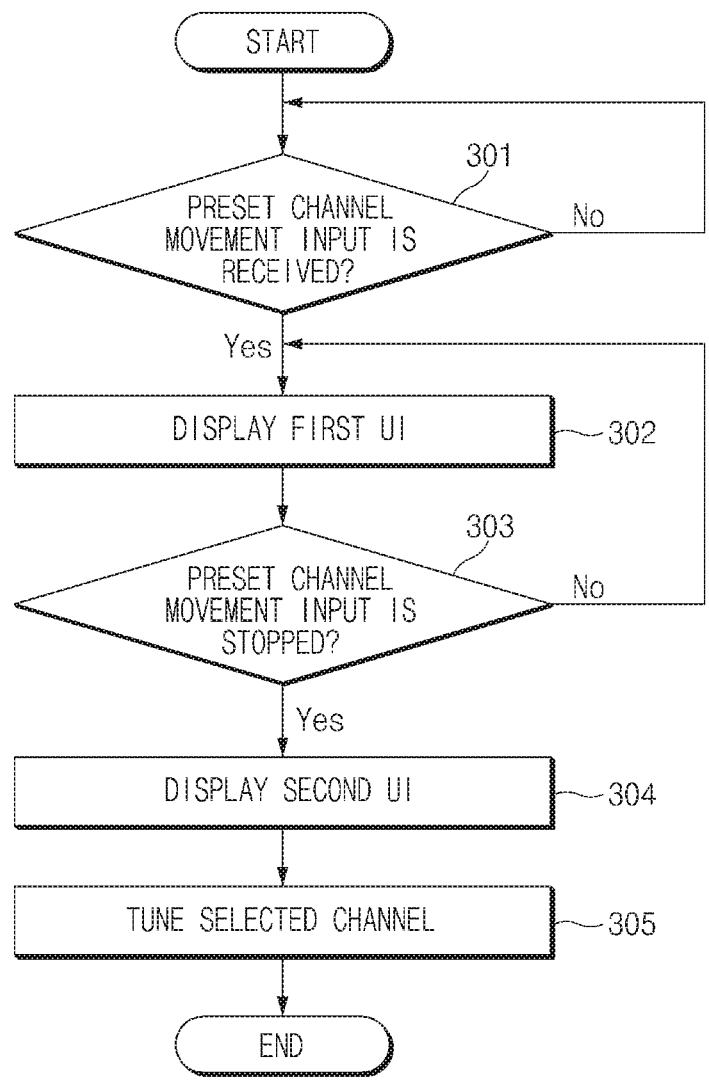
FIG. 3 is a flowchart illustrating a method of displaying a UI and tuning a channel, according to an example embodiment.

FIG. 3 is a flowchart illustrating a method of displaying a UI and tuning a channel, according to an example embodiment;

In operation 301, the processor 140 may determine whether a preset user input is received through the second communication module 112.

For example, a user input may be a channel-up input or a channel-down input, and a preset user input may be a channel-up input or a channel-down input continuously made for a predetermined time.

According to an example embodiment, when the remote control device, such as a remote controller, continuously transmits a user input, the remote control device may discontinuously transmit a user input signal. Accordingly, the preset user input may a channel-up input or a channel-down input repeatedly made by the predetermined number of times or more within the predetermined time.

According to an example embodiment, in the case that the second communication module 112 receives a user input one time, the processor 140 may change a channel based on the user input.

Figure 4:
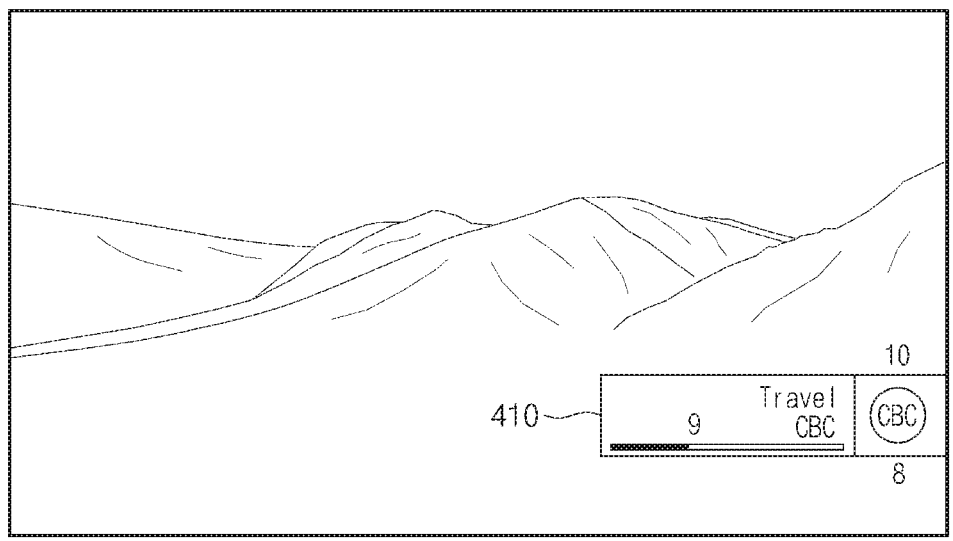
FIG. 4 is a view illustrating a screen for displaying a channel changed depending on a channel movement input, according to an example embodiment.

FIG. 4 is a view illustrating a screen on which a channel is changed depending on a user input, according to an example embodiment.

As illustrated in FIG. 4, the processor 140 may display information 410 on a channel of broadcast content, which is displayed, on the display 120 if a channel change occurs. The information 410 on the channel may include a channel number of the channel, the name of a program broadcasted through the channel, the name of the channel, the icon of the channel, a broadcasting time of the program, which is being broadcasted, or the broadcast content, which is displayed, and information on a channel adjacent to a channel of the displayed broadcast content. For example, as illustrated in FIG. 4, the processor 140 may display, on the display 120, '9' as the channel number, 'Travel' as the name of the program broadcasted through the channel, 'CBC' as the name of the channel, a status bar representing the broadcasting time of the program which is being broadcasted, and '8' and '10' as adjacent channels.

According to an example embodiment, while the processor is receiving the preset user input, the processor 140 may display, on the display 120, the first UI including a scroll bar, a cursor moving on the scroll bar depending on the user input, and information on a channel corresponding to a point at which the cursor is displayed, in operation 302.

According to an example embodiment, the scroll bar may include a point corresponding to at least one preset channel among channels of one or more broadcast contents received by the display device 100. In addition, points may be arranged in the order of numbers of relevant channels. For example, in the case that there are 30 channels numbered with '1' to '30' (channel #1 to channel #30) for broadcast contents received by the display device 100, the scroll bar may include 30 points corresponding to the 30 channels.

According to an example embodiment, all points corresponding to at least one preset channel may be arranged on the scroll bar displayed on the display 120. For example, in the case that preset channels are numbered with '1' to '20' (channel #1 to channel #20), all points corresponding to the channels may be arranged on the scroll bar on the display 120. For example, if each point is displayed on a screen, all points may be displayed on one screen.

According to an example embodiment, the scroll bar may include a point corresponding to a channel included in a preset category. For example, if channel #5 to channel #10 are included in a sports category among channel #1 to channel #30 for the broadcast content received by the display device 100, and if the sports category is selected, the scroll bar may include only points corresponding to channel #5 to channel #10.

According to another example embodiment, the moving speed of a cursor on the scroll bar may be constant regardless of the number of points corresponding to the channels. For example, the moving speed of the cursor may be constant in both cases that points corresponding to channels included in the scroll bar are 30 or 10.

A cursor may be positioned at a point included in the scroll bar and may move depending on a user input. For example, in the case that the user inputs are continuous channel-up inputs, the cursor may move up on the scroll bar. If the cursor is positioned at the uppermost point among points included in the scroll bar and if the continuous channel-up input is received, the cursor may be positioned at the lowermost point among points included in the scroll bar and then may move up again.

The information on the channel may include at least one of a channel number of the channel, the name of a program broadcasted through the channel, and a channel name of the channel.

Hereinafter, the example of the first UI will be described in more detail with reference to FIGS. 5A to 5D.

Figure 5A:
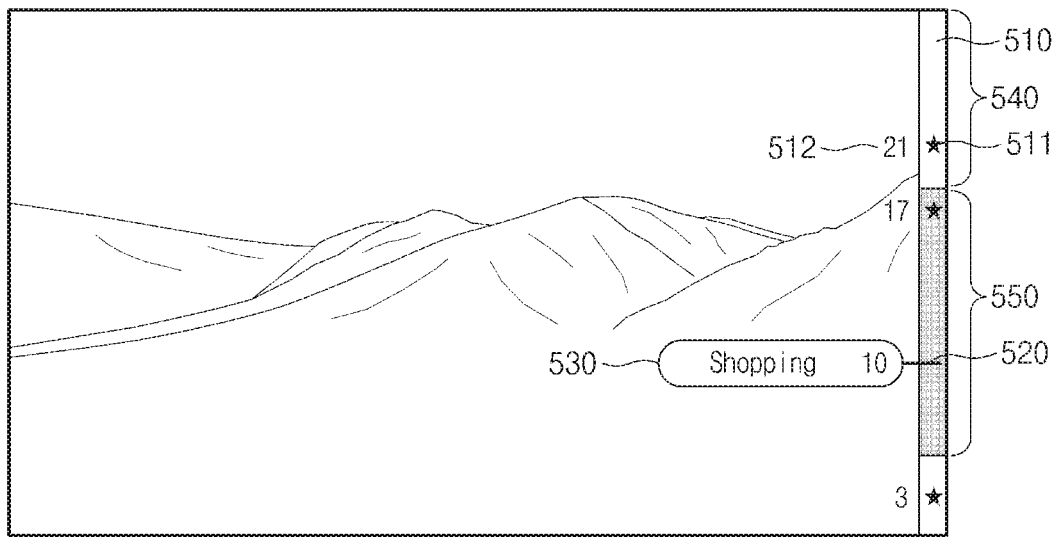
FIGS. 5A and 5B are views illustrating screens for displaying a first UI depending on a preset channel movement input, according to an example embodiment.
Figure 5B:
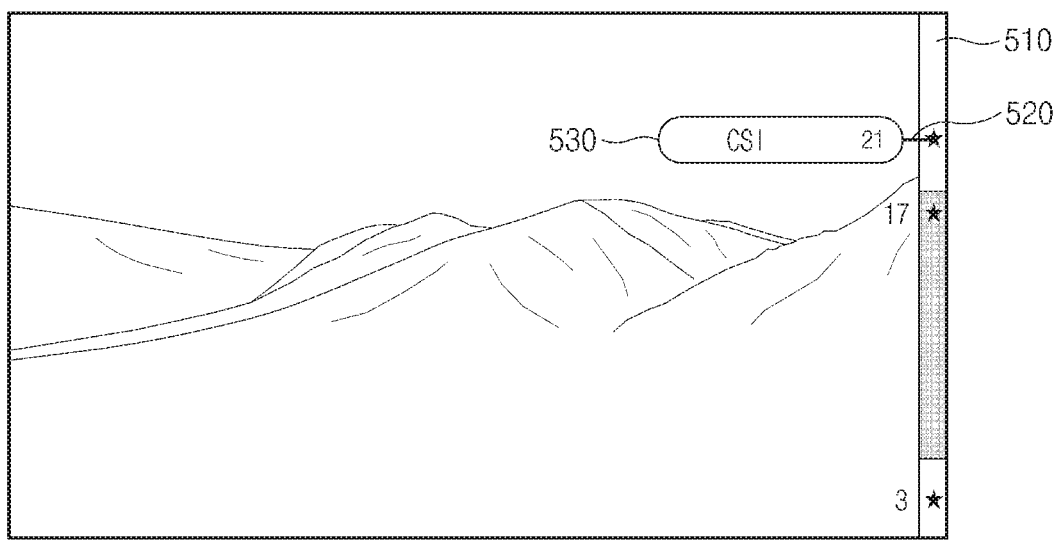
Figure 5C:
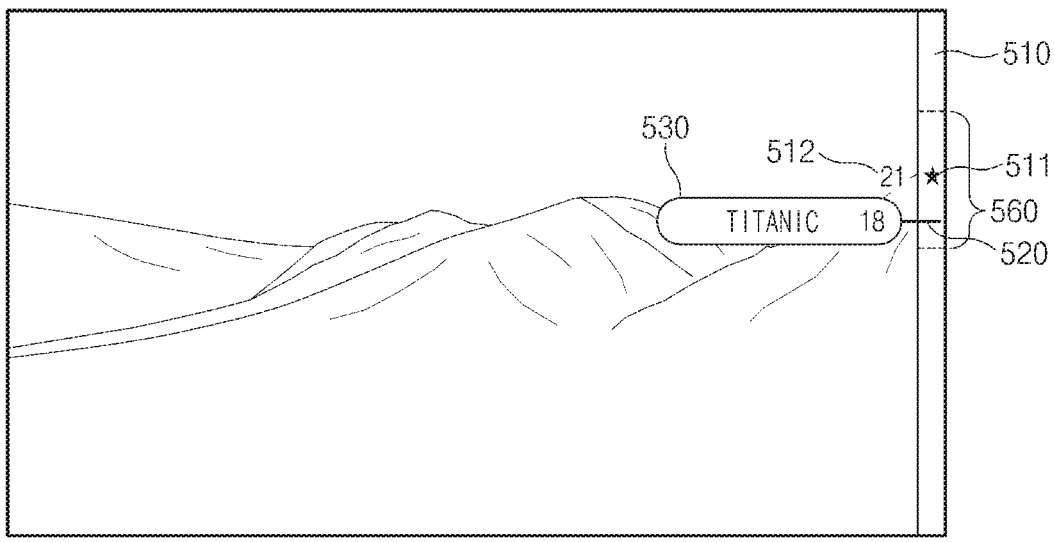
FIGS. 5C and 5D are views illustrating that a cursor of a first UI is positioned in a range adjacent to a preset point, according to an example embodiment.
Figure 5D:
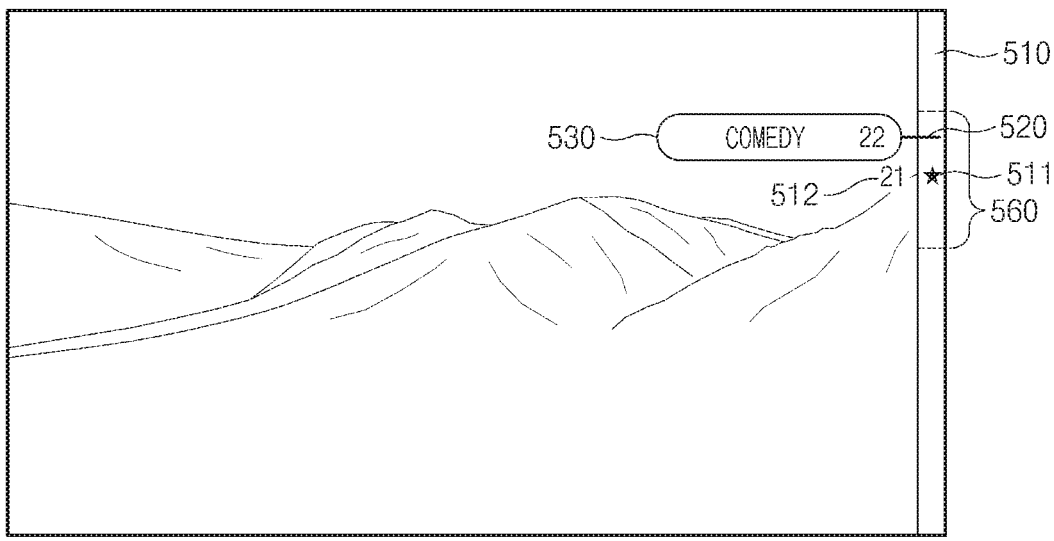

FIGS. 5A and 5B are views illustrating screens for displaying a first UI based on a preset user input, according to an example embodiment. FIGS. 5C and 5D are views illustrating that a cursor of the first UI is positioned in a range adjacent to a preset point, according to an example embodiment.

Referring to FIGS. 5A and 5B, the first UI may include a scroll bar 510, a cursor 520, and information 530 on a channel.

Based on the continuous channel-up inputs which are the preset user inputs, the cursor 520 may move up from a point on the scroll bar 510 corresponding to channel #10 as illustrated in FIG. 5A to a point corresponding to channel #21 as illustrated in FIG. 5B. During the reception of the continuous channel-up input, the cursor 520 may pass through points corresponding to channels between channel #10 to channel #21. In addition, if the continuous channel-up input is continuously received, the cursor 520 may move up after passing through channel #21.

According to an example embodiment, in the case that continuous channel-down input, which is the preset user input, is received, the cursor 520 may move down on the scroll bar 510.

According to an example embodiment, the scroll bar 510 may include an indicator displayed on a portion of a plurality of points on the scroll bar 510 and at least one of channel numbers corresponding to the indicator. The preset channel may be a channel set by a user or a channel that the user has viewed by a specific number of times.

As illustrated in FIGS. 5A and 5B, in the case that the preset channels correspond to channels #3, #17, and #21, star-shaped indicators 511 and channel numbers 512 may be displayed on points corresponding to channels #3, #17, and #21.

According to an example embodiment, channels corresponding to points of the scroll bar 510 may be included in mutually different categories, respectively. On the scroll bar 510, an area including points corresponding to channels included in the first category and an area including points corresponding to channels included in the second category may be displayed while being visually distinguished therebetween.

As illustrated in FIGS. 5A and 5B, channel #21 may be included in the first category (e.g., air channel broadcasting category) and channel #10 and channel #17 may be included in the second category (e.g., an Internet broadcasting category). As illustrated in FIGS. 5A and 5B, an area 540 including channels included in the first category and an area 550 including channels included in the second category may be displayed while being visually distinguished therebetween.

According to an example embodiment, the scroll bar 510 may include a first area including a point corresponding to a preset channel and a second area which is an area other than the first area. The cursor 520 may move, depending on the user input, at a first speed on the first area and at a second speed faster than the first speed on the second area.

As illustrated in FIGS. 5C and 5D, the first area including a point corresponding to channel #21, which is a preset channel, is an area 560, and the area 560 may be an area in a predefined proximity range from the indicator 511 corresponding to channel #21. The second area may be an area in the scroll bar 510 other than the area 560.

The cursor 520 may move up based on the continuous channel-up inputs which are the preset user inputs. The cursor 520 may move at the faster moving speed when the cursor 520 is positioned in the second area rather than when the cursor 520 is positioned in the first area 560.

For example, if the cursor 520 is positioned in the second area under the first area 560 as illustrated in FIG. 5C and if the continuous channel-up input is received, the cursor 520 may move up at a second speed. If the cursor 520 is positioned in the first area 560 while moving up, the cursor 520 may move at a first speed slower than the second speed. As the cursor 520 moves, if the cursor 520 is positioned in the second area after passing through the first area, the cursor 520 may move at the second speed faster than the first speed.

The above-described first UI may be displayed during the reception of the preset user input.

In operation 303, the processor 140 may determine whether the preset user input through the second communication module 112 is stopped.

For example, the continuous channel-up input or the continuous channel-down input may be received and then stopped, which represents the stop of the preset user input.

If the preset user input is stopped, the processor 140 may display, on the display 120, a second UI including information on one or more channels adjacent to a channel corresponding to a point at which the cursor is positioned in operation 304.

According to an example embodiment, the cursor may be positioned at a point corresponding to when the preset user input is stopped.

According to an example embodiment, if the reception of the preset user input is stopped in the state that the cursor is displayed in the predetermined proximity range from the point corresponding to at least one preset channel, the cursor may be moved the point corresponding to the at least one preset channel.

Figure 6A:
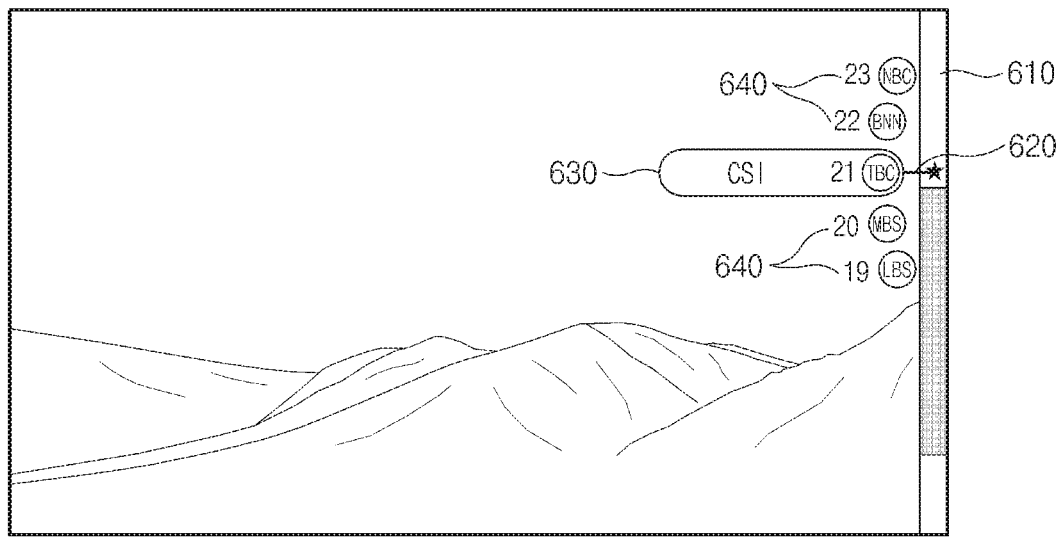
FIGS. 6A and 6B are views illustrating screens on which a second UI is displayed due to the stop of the preset channel movement input, according to an example embodiment.

As illustrated in FIGS. 5C and 5D, an area in the proximity range from a point corresponding to channel #21 which is the preset channel, is the first area 560. The cursor 520 is positioned at a point corresponding to channel #18 in FIG. 5C, and is positioned at a point corresponding to channel #22 in FIG. 5D. The points corresponding to channel #18 and channel #22 are included into the area in the proximity range from the point corresponding to channel #21. Therefore, if the preset user input is stopped in the state that the cursor 520 is positioned as illustrated in FIG. 5C or 5D, a cursor 620 may be moved to the point corresponding to channel #21 as illustrated in FIG. 6A.

According to an example embodiment, the second UI may include information on at least one of channel having numbers, which are larger and smaller than a channel number at which the cursor is positioned.

According to an example embodiment, the information on the channel may include at least one of a channel number of the channel, the name of a program broadcasted through a channel, a channel name of the channel, and a channel logo of the channel.

According to an example embodiment, if the second UI is displayed, the processor 140 may move a cursor on a scroll bar without changing the channel even if a user input is received.

Hereinafter, the example of the second UI will be more described with reference to FIGS. 6A and 6B.

Figure 6B:
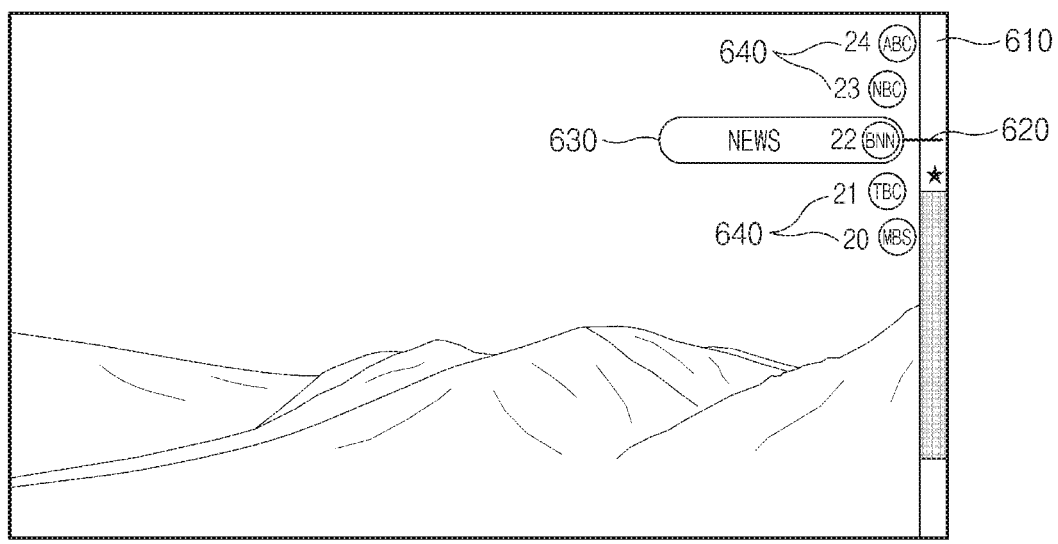

FIGS. 6A and 6B are views illustrating screens for displaying the second UI due to the stop of the preset user input, according to an example embodiment.

As illustrated in FIG. 6A, even if the second UI including information 640 on at least one channel adjacent to a channel corresponding to the cursor 620 is displayed, the processor 140 may display, on the display 120, a scroll bar 610, the cursor 620, and information 630 on channel #21 corresponding to the position of the cursor 620 which are included in the first UI.

Based on the channel-up input which is a user input, the cursor 620 may move up from a point corresponding to channel #21 as illustrated in FIG. 6A to a point corresponding to channel #22 as illustrated in FIG. 6B.

As the cursor 620 moves, the processor 140 may display, based on the position of the cursor 620, the cursor 620, information 630 on a channel corresponding to the position of the cursor 620, and information 640 on a channel adjacent to channel #22, which is included in the second UI.

According to an example embodiment, in the case that the channel-down input, which is the preset user input, is received, the cursor 620 may move down on the scroll bar 610.

According to an example embodiment, the processor 140 may select a channel based on the user input through the second UI. For example, if the user input is not received even though the second UI is displayed, and thus the cursor is maintained in a displayed state at a certain point for a preset time or more, the processor 140 may select a channel corresponding to the point at which the cursor is displayed. According to an example embodiment, if the second UI is displayed and the user input, such as a selection input, is received, the processor 140 may select a channel corresponding to a point at which the cursor is displayed.

If the user input is not received for the preset time in the state that the second UI is displayed as illustrated in FIG. 6B, the processor 140 may select channel number #22. In addition, in FIG. 6B, even if the selection input is received, the processor 140 may select channel #22.

In operation 305, the processor 140 may tune the channel of the broadcast content, which is displayed, to the selected channel.

If the channel is selected through the first UI and the second UI, the processor 140 may tune the channel of the broadcast content displayed to the selected channel.

For example, as channel #22 is selected as illustrated in FIG. 6, the processor 140 may tune the channel of the broadcast content displayed on the display 120 to channel #22.

Figure 7:
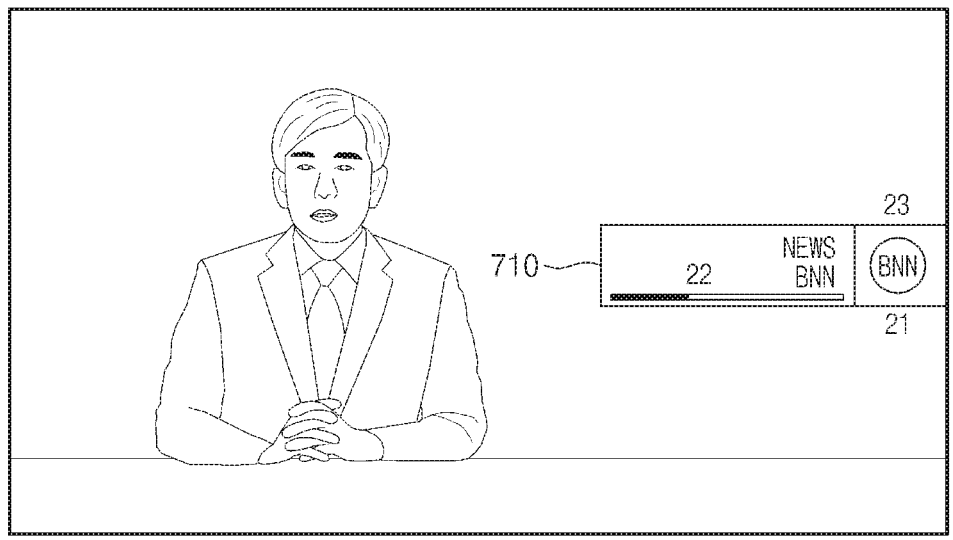
FIG. 7 is a view illustrating a screen on which content based on a selected channel is displayed, according to an example embodiment.

FIG. 7 is a view illustrating a screen for displaying broadcast content based on the selected channel, according to an example embodiment.

As illustrated in FIG. 7, the display 120 may display broadcast content of channel #22. According to an example embodiment, the processor 140 may display information 710 on the tuned information.

Figure 8:
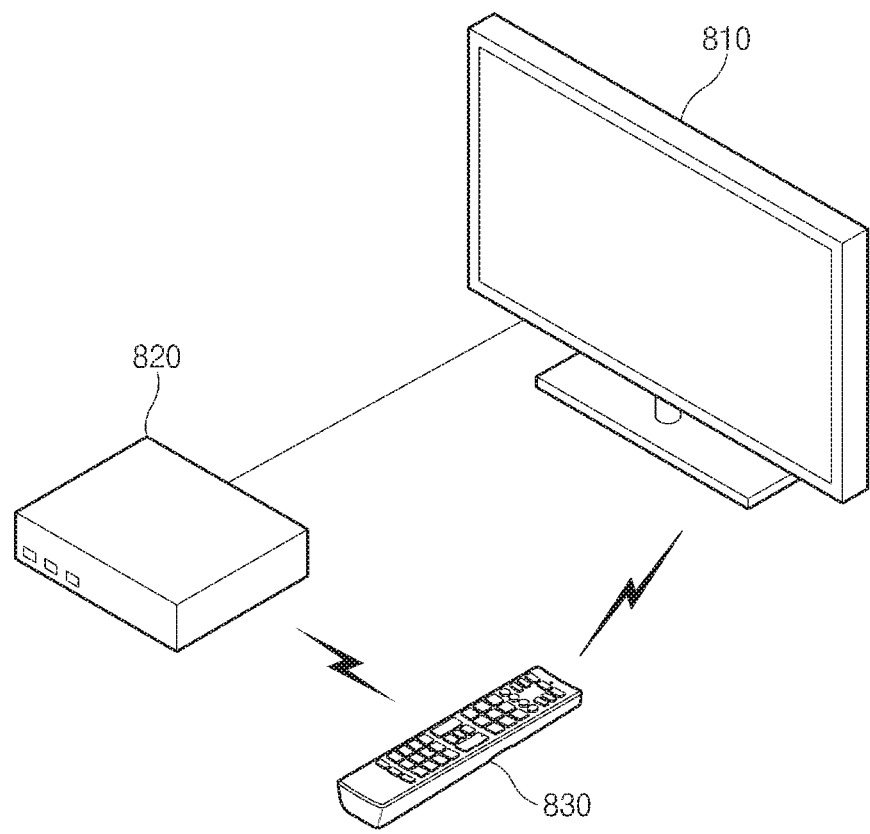
FIG. 8 is a view illustrating a display device, an external electronic device, and a remote controller, according to an example embodiment.

FIG. 8 is a view illustrating a display device 810, an external electronic device 820, and a remote control device 830, according to an example embodiment.

According to an example embodiment, the display device 810 may receive the broadcast content from the external electronic device 820. For example, the display device 810 may receive broadcast content from a set-top box.

According to an example embodiment, the remote control device 830 may transmit a user input to the display device 810. According to an example embodiment, the remote control device 830 may receive a control signal from the display device 810 to transmit an input signal to the external electronic device 820. In addition, the remote control device 830 may transmit the input signal to the external electronic device 820 in response to the control signal.

For example the remote control device 830 may be a remote controller, a mouse, a keyboard, or the like. The remote control device 830 may transmit a user input through Bluetooth, IR communication, or Wi-Fi.

Hereinafter, description will be made, with reference to FIGS. 9 to 13B, regarding a method that the display device 100 directly receiving broadcast content from the broadcast signal provider displays the UI and performs tuning to a channel selected through the UI. The memory 130 of the display device 100 stores meta data (e.g., information on a channel of broadcast content transmitted by the electronic device) used to display the first UI and the second UI by the processor 140 on the display 120.

Figure 9:
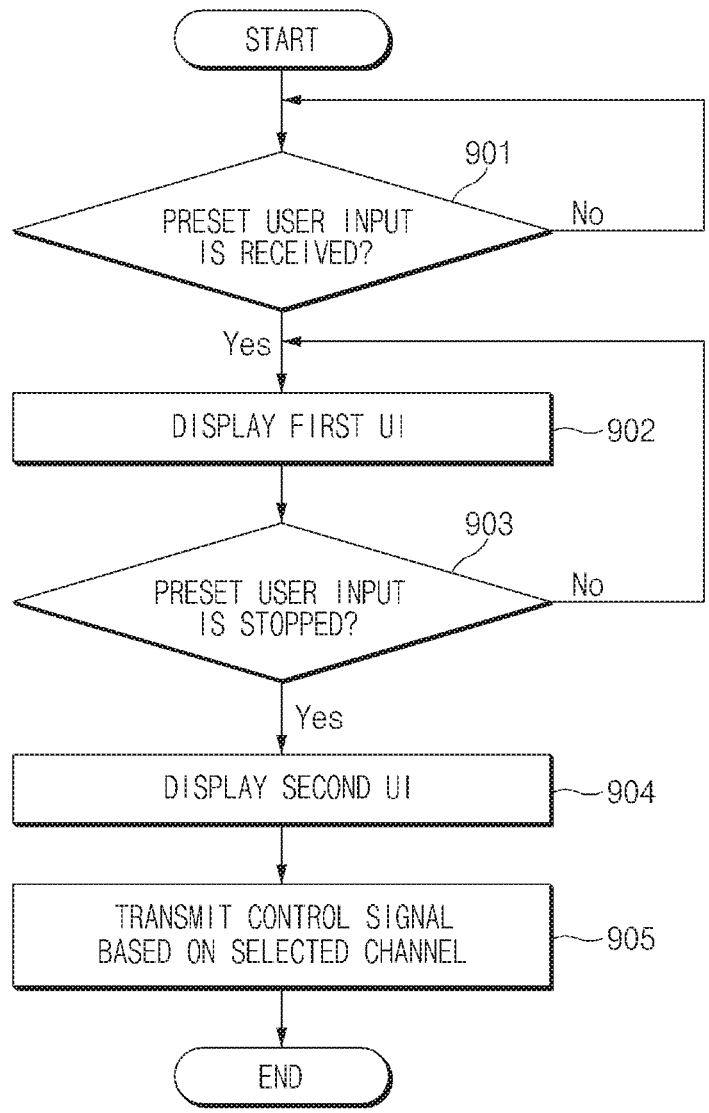
FIG. 9 is a flowchart illustrating a method of displaying a UI and transmitting a control signal depending on an input, according to an example embodiment.

FIG. 9 is a flowchart illustrating a method of displaying a UI and transmitting a control signal depending on an input, according to an example embodiment.

In operation 901, the processor 140 may determine whether a preset user input is received through the second communication module 112.

Since operation 901 is identical to operation 301 described above, the description of redundant details thereof will be omitted below.

According to an example embodiment, in the case that the second communication module 112 receives a user input one time, the processor 140 may transmit a control signal, which is to transmit the received user input to the external electronic device, to the remote control device through the second communication module 112.

Figure 10:
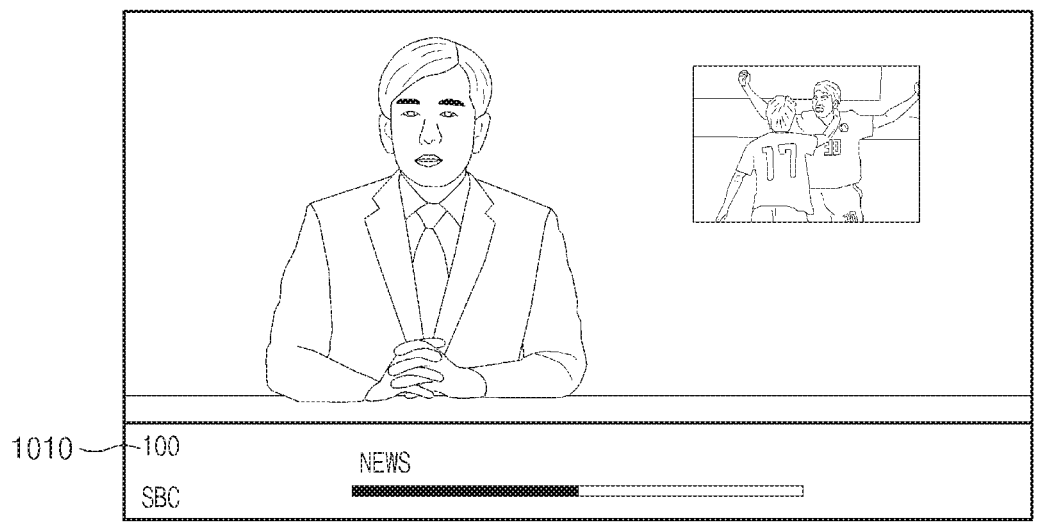
FIG. 10 is a view illustrating a screen on which content received from an external electronic device is displayed, according to an example embodiment.

FIG. 10 is a view illustrating a screen on which broadcast content received from an external electronic device is displayed, according to an example embodiment;

If the display device 100 receives the channel-up input from the remote control device while displaying broadcast content corresponding to channel #99 from the electronic device after receiving the broadcast content, the processor 140 may transmit a control signal to the remote control device such that the remote control device transmits the channel-up input to the external electronic device.

If the remote control device transmits the channel-up input to the external electronic device in response to the control signal, the remote control device may tune the channel and may transmit the broadcast content corresponding to channel #100 to the display device 100. As illustrated in FIG. 10, the display device 100 may display the broadcast content 1010 corresponding to channel #100 as illustrated in FIG. 10. The broadcast content received by the display device 100 may include a channel number, a channel name, the name of a program broadcasted through the channel, or time information of the program.

According to an example embodiment, the processor 140 may detect the channel of the broadcast content by recognizing a text included in the information on the channel displayed on the display 120.

According to an example embodiment, an initial position of a cursor on a scroll bar on the first UI, which is to be described below, may a point corresponding to the detected channel.

According to an example embodiment, when the preset user input is received, the processor 140 may display, on the display 120, the first UI including a scroll bar, a cursor moving depending on the user input on the scroll bar, and information on a channel, which corresponds to a display point of the cursor in operation 902.

Since operation 902 is identical to operation 302 described above, the description of redundant details thereof will be omitted below.

Figure 11A:
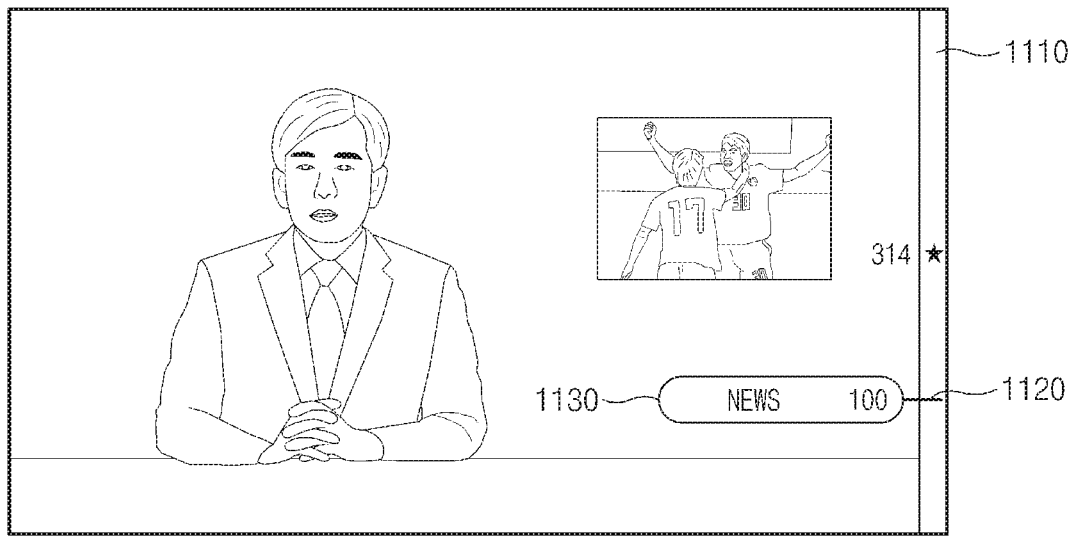
FIGS. 11A and 11B are views illustrating screens on which a first UI is displayed depending on a preset channel movement input, according to an example embodiment.
Figure 11B:
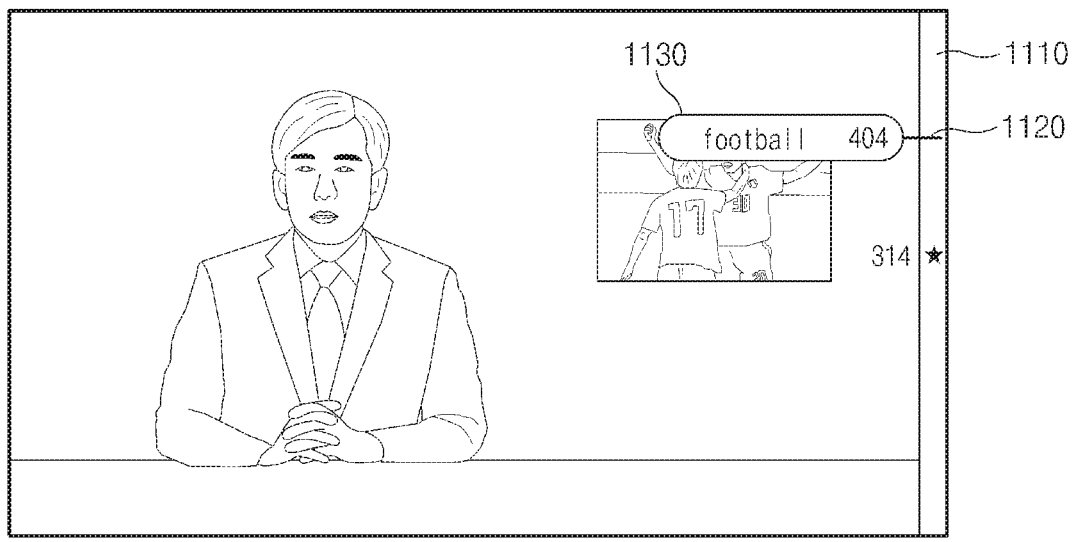

FIGS. 11A and 11B are views illustrating screens on which the first UI is displayed depending on a preset user input, according to an example embodiment;

Referring to FIGS. 11A and 11B, the first UI may include a scroll bar 1110, a cursor 1120, and information 1130 on a channel.

Based on the continuous channel-up inputs which are the preset user inputs, the cursor 1120 may move up from a point on the scroll bar 1110 corresponding to channel #100 as illustrated in FIG. 11A to a point corresponding to channel #404 as illustrated in FIG. 11B. During the reception of the continuous channel-up input, the cursor 1120 may pass through points corresponding to channels between channel #100 to channel #404. In addition, if the continuous channel-up input is continuously received, the cursor 1120 may move up after passing through channel #404.

According to an example embodiment, in the case that a continuous channel-down input, which is a preset user input, is received, the cursor 1120 may move down on the scroll bar 1110.

In operation 903, the processor 140 may determine whether a preset user input is stopped through the second communication module 112.

Since operation 903 is identical to operation 303 described above, the description of redundant details thereof will be omitted below.

If the preset user input is stopped, the processor 140 may display, on the display 120, a second UI including information on one or more channels adjacent to a channel corresponding to a point at which the cursor is positioned in operation 904.

Since operation 904 is identical to operation 304 described above, the description of redundant details thereof will be omitted below.

Figure 12A:
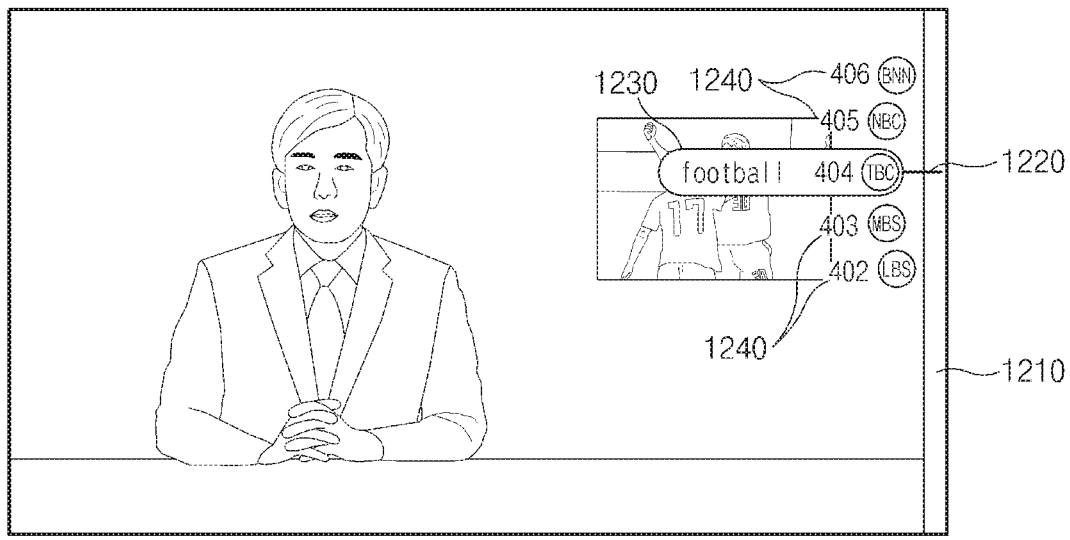
FIGS. 12A and 12B are views illustrating screens for displaying a second UI due to the stop of the preset channel movement input, according to an example embodiment.
Figure 12B:
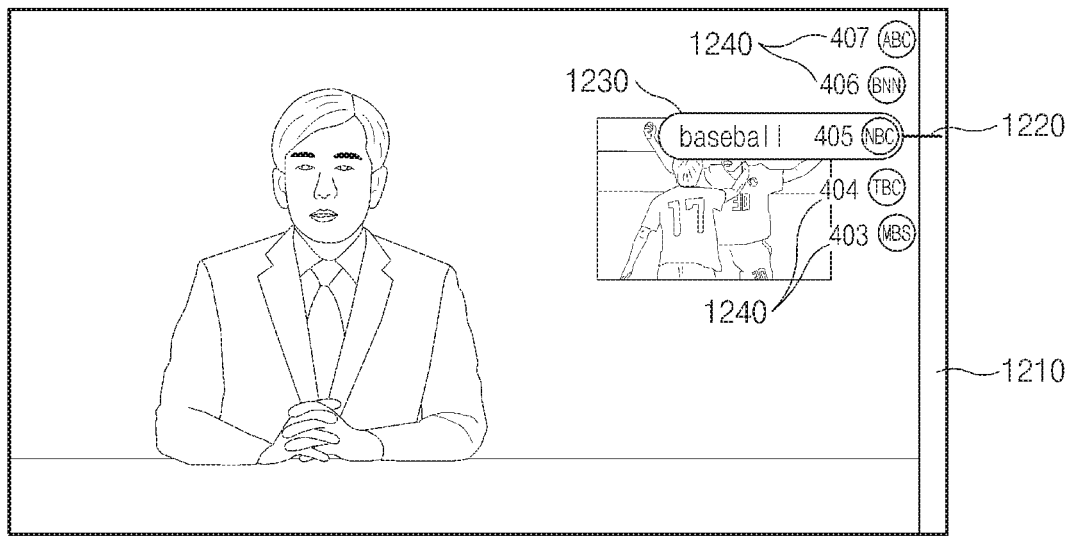

FIGS. 12A and 12B are views illustrating screens on the second UI is displayed due to the stop of the preset user input, according to an example embodiment.

As illustrated in FIG. 12A, even when the second UI including information 1240 on one or more channels adjacent to the channel corresponding to a cursor 1220, the processor 140 may display, on the display 120, information 1230 on a scroll bar 1210, the cursor 1220, and information 1230 on channel #404 corresponding to the position of the cursor 1220, which are included in the first UI.

Based on the channel-up input which is a user input, the cursor 1220 may move up from a point corresponding to channel #404 as illustrated in FIG. 12A to a point corresponding to channel #405 as illustrated in FIG. 12B.

As the cursor 1220 moves, the processor 140 may display the cursor 1220, information 1230 on the channel corresponding to the position of the cursor 1220, and information 1240 on a channel adjacent to channel #405 included in the second UI, depending on the position of the cursor 1220.

According to an example embodiment, in the case that channel-down input is received, the cursor 1220 may move down on the scroll bar 1210.

According to an example embodiment, the processor 140 may select a channel based on the user input through the second UI. For example, if the user input is not received even though the second UI is displayed, and thus the cursor is maintained in a displayed state at a certain point for a preset time or more, the processor 140 may select a channel corresponding to the point at which the cursor is displayed. In addition, if the second UI is displayed and a user input, such as a selection input, is received, the processor 140 may select a channel corresponding to a point at which the cursor is displayed.

If the user input is not received for the preset time in the state that the second UI is displayed as illustrated in FIG. 12B, the processor 140 may select channel number #405. In addition, even if the selection input is received in FIG. 12B, the processor 140 may select channel #405.

In operation 905, the processor 140 may transmit a control signal based on the selected channel to the remote control device. According to an example embodiment, in operation 905, the display device may transmit the control signal to the remote control device.

According to an example embodiment, if the channel is selected through the second UI, the processor 140 may transmit a control signal to the remote control device such that the remote control device transmits a signal for inputting the number of the selected channel to the external electronic device. For example, if channel #405 is selected through the second UI, the processor 140 may transmit a control signal to the remote control device such that the remote control device transmits a signal for inputting '405' to the external electronic device.

According to an example embodiment, the processor 140 may directly transmit a channel number input, which corresponds to the selected channel, to the external electronic device through the second communication module 112. For example, the second communication module 112 may transmit a channel number input through a communication scheme (e.g., IR communication) in which the external electronic device receives the channel number input.

Figure 13A:
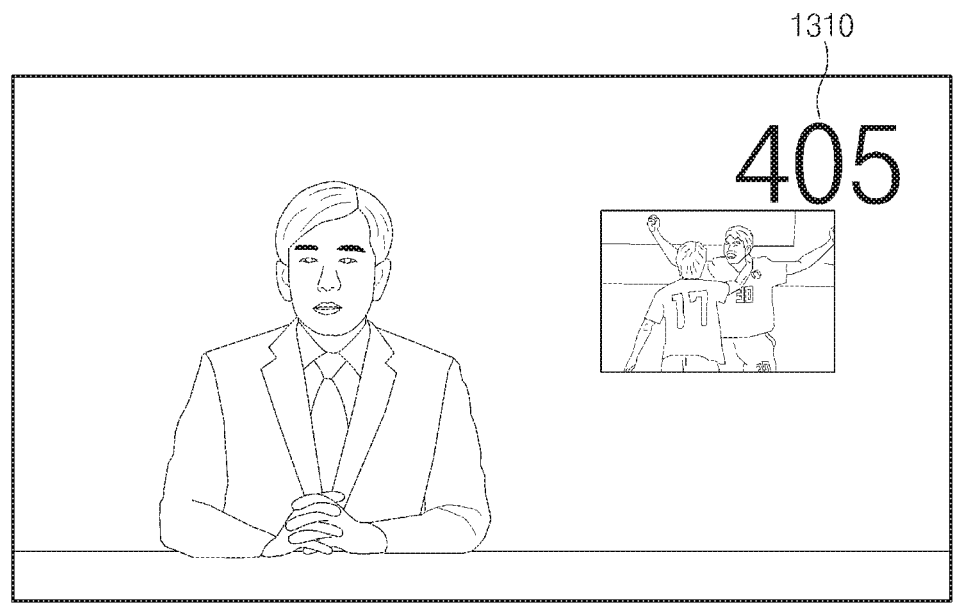
FIG. 13A is a view illustrating a screen on which a selected channel number is displayed, according to an example embodiment.
Figure 13B:
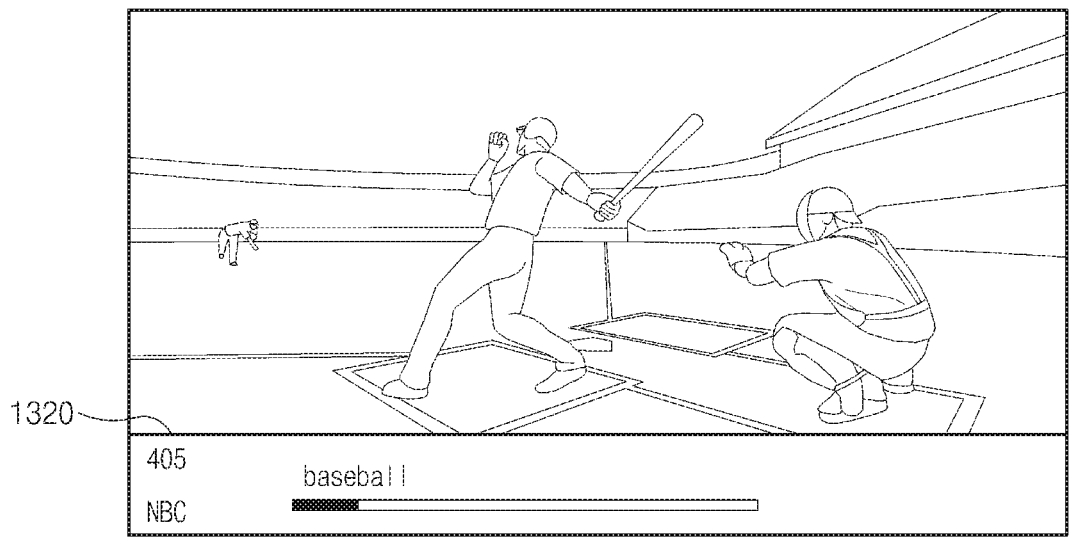
FIG. 13B is a view illustrating a screen on which content based on a selected channel is displayed, according to an example embodiment.

FIG. 13A is a view illustrating a screen on which the number of a selected channel is displayed, according to an example embodiment. FIG. 13B is a view illustrating a screen on which broadcast content based on a selected channel, is displayed according to an example embodiment.

If a channel number input is transmitted to the external electronic device, a channel number 1310 may be displayed on the display 120.

The external electronic device may perform tuning to a channel of the input number and may transmit broadcast content to the display device 100. The display device 100 may display broadcast content based on the received broadcast content as illustrated in FIG. 13B. The broadcast content received by the display device 100 may include information 1320 on a channel, such as a channel number, a channel name, the name of a program broadcasted through the channel, or time information of the program.

At least part of a device (e.g., modules or functions thereof) or a method (e.g., operations) according to various example embodiments may be, for example, implemented by instructions stored in a computer-readable storage medium in the form of a program module. The instruction, when executed by a processor (e.g., a processor 200), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and an embedded memory. The instruction may include codes formed by a compiler or codes executable by an interpreter.

While example embodiments have been shown and described, it will be understood by those skilled in the art that various changes in form and details may be made therein without departing from the spirit and scope of the present disclosure.

What is claimed is:

1. A display device comprising
a first communication interface configured to receive broadcast content from an external device;
a second communication interface configured to receive a user input;
a memory configured to store information about a channel of the broadcast content received from the external electronic device;
a display; and
a processor that is electrically connected to the display, the first communication interface, and the second communication interface,
wherein the processor is configured to:
while receiving a preset user input through the second communication interface, control the display to display a first user interface (UI) comprising a scroll bar including a plurality of points corresponding to a plurality of channels, a cursor moving on the scroll bar depending on the preset user input, and information about a channel corresponding to a point at which the cursor is displayed;
in response to the preset user input being stopped, control the display to additionally display a second UI comprising information about one or more channels adjacent to the channel corresponding to the point at which the cursor is displayed,
select a channel among the plurality of channels based on the preset user input; and
transmit a signal based on the selected channel through the second communication interface such that an input for the selected channel is transmitted to the external electronic device,
wherein the scroll bar comprises a first area and a second area, the first area corresponding to a region on the scroll bar that includes a plurality of channels and an indicator corresponding to a preset channel, and the second area corresponding to one or more regions on the scroll bar that are located outside the first area,
wherein the preset user input is a continuous input received while the cursor moves on the first area and the second area,
wherein the cursor moves at a first speed based on receiving the continuous input while the cursor is located within the first area of the scroll bar, and
wherein the cursor moves at a second speed based on receiving the continuous input while the cursor is located within the second area of the scroll bar, the second speed being faster than the first speed.

2. The display device of claim 1, wherein the preset user input is a channel movement input occurring a predetermined number of times within a predetermined time.

3. The display device of claim 1, wherein the second UI comprises:
at least one from among a number of the channel corresponding to the point at which the cursor is displayed, a name of a program broadcast through the channel corresponding to the point at which the cursor is displayed, and a name of the channel corresponding to the point at which the cursor is displayed.

4. The display device of claim 1, wherein the first UI comprises an indicator displayed at a portion of the plurality of points of the scroll bar.

5. The display device of claim 4, wherein the first UI further comprises a number of the channel corresponding to the indicator.

6. The display device of claim 4, wherein the cursor moves to a point corresponding to the indicator in response to reception of the preset user input being stopped in a state in which the cursor is displayed in the first area.

7. The display device of claim 1, wherein the first area corresponds to a portion of the plurality of channels, the portion of the plurality of channels corresponding to a first category, and the second area corresponds to another portion of the plurality of channels, in the another portion of the plurality of channels corresponding to a second category, and
wherein the first area is visually distinguished from the second area.

8. The display device of claim 1, wherein the processor is further configured to:
recognize a text displayed on the display to detect a channel of broadcast content output on the display,
wherein an initial position of the cursor on the scroll bar is a point corresponding to the detected channel.

9. The display device of claim 1, wherein the processor is further configured to:
transmit a channel number input, which corresponds to the selected channel, to the external electronic device through the second communication interface.

10. The display device of wherein the second communication interface is further configured to receive the preset user input from a remote control device, and
wherein the processor is further configured to:
transmit a control signal to the remote control device through the second communication interface such that the remote control device transmits a signal for inputting a number of the selected channel to the external electronic device.

11. The display device of claim 1, wherein the processor is further configured to:
select a channel corresponding to a point at which the cursor is displayed for a preset time.

12. The display of claim 11, wherein the preset channel may be a channel set by a user or a channel that the user has viewed by a specific number of times.

13. A controlling method of a display device, the controlling method comprising:
receiving broadcast content from an external device;
receiving a preset user input;
displaying, while receiving the preset user input, a first user interface (UI) comprising a scroll bar including a plurality of points corresponding to a plurality of channels, a cursor moving on the scroll bar depending on the preset user input, and, information about a channel corresponding to a point at which the cursor is displayed; and
moving the cursor on the scroll bar based on, the preset user input;
displaying, in response to the preset user input being stopped, a second UI comprising information about one or more channels adjacent to the channel corresponding to the point at which the cursor is displayed;
selecting the channel corresponding to the point at which the cursor is displayed, depending on, the preset user input; and
transmitting a signal based on the selected channel such that an input for the selected channel is transmitted to the external electronic device,
wherein the scroll bar comprises a first area and a second area, the first area corresponding to a region on the scroll bar that includes a plurality of channels and an indicator corresponding to a preset channel, and the second area corresponding to one or more regions on the scroll bar that are located outside the first area,
wherein the preset user input is a continuous input received while the cursor moves on the first area and the second area,
wherein the cursor moves at a first speed based on receiving the continuous input while the cursor is located within the first area of the scroll bar, and
wherein the cursor moves at a second speed based on receiving the continuous input while the cursor is located within the second area of the scroll bar, the second speed being faster than the first speed.

14. The controlling method of claim 13, wherein the preset user input is a channel movement input occurring a predetermined number of times within a predetermined time.

15. The controlling method of claim 13, wherein the second comprises at least one from among a number of the channel corresponding to the point at which the cursor is displayed, a name of a program broadcast through the channel corresponding to the point at which the cursor is displayed, and a name of the channel corresponding to the point at which the cursor is displayed.

16. The controlling method of claim 13, wherein the first UI comprises an indicator displayed on a portion of the plurality of points of the scroll bar.

17. The controlling method of claim 16, further comprising:
moving the cursor to a point corresponding to the indicator in response to reception of the preset user input being stopped in a state in which the cursor is displayed in the first area.

18. The controlling method of claim 13, further comprising:
transmitting, to a remote control device, a control signal for transmitting an input signal based on the selected channel to the external electronic device.

19. The controlling method of claim 13, wherein the selecting of the channel comprises selecting a channel corresponding to a point at which the cursor is displayed for a preset time.

* * * * *